United States Patent

Svanberg et al.

[11] Patent Number: 5,483,379
[45] Date of Patent: Jan. 9, 1996

[54] IMAGE REGISTERING IN COLOR AT LOW LIGHT INTENSITY

[76] Inventors: Sune Svanberg, Stenåldersvägen 95, S-22654 Lund; Jonas Johansson, Kollegievägen 266, S-224 73 Lund, both of Sweden

[21] Appl. No.: 146,120

[22] PCT Filed: May 13, 1992

[86] PCT No.: PCT/SE92/00312

§ 371 Date: Nov. 12, 1993

§ 102(e) Date: Nov. 12, 1993

[87] PCT Pub. No.: WO92/21205

PCT Pub. Date: Nov. 26, 1992

[30] Foreign Application Priority Data

May 14, 1991 [SE] Sweden ................................ 9101438

[51] Int. Cl.[6] .................................................. G01N 21/64
[52] U.S. Cl. ................................................ 359/634; 348/217
[58] Field of Search ....................................... 359/634, 364, 359/353, 359; 250/214 VT, 207, 214 AL; 348/217, 216, 218

[56] References Cited

U.S. PATENT DOCUMENTS

| | | | |
|---|---|---|---|
| 2,548,118 | 4/1951 | Morton | 348/216 |
| 3,589,811 | 6/1971 | Berger | 355/32 |
| 3,720,146 | 3/1973 | Yost | 95/12.2 |
| 3,812,526 | 5/1974 | Tan | 250/214 VT |
| 4,652,739 | 3/1987 | Sciamanda | 250/213 VT |
| 4,786,813 | 11/1988 | Svanberg | 250/461.1 |
| 4,801,212 | 1/1989 | Imura | 374/130 |
| 5,157,548 | 10/1992 | Monnier | 359/353 |
| 5,162,647 | 11/1992 | Field, Jr. | 250/214 VT |
| 5,214,503 | 5/1993 | Chiu | 358/50 |
| 5,241,170 | 8/1993 | Field, Jr. | 250/214 VTj |

*Primary Examiner*—Georgia Y. Epps
*Assistant Examiner*—Ricky Mack
*Attorney, Agent, or Firm*—Fisher, Christen & Sabol

[57] ABSTRACT

In a combination of a focusing optics for imaging a scene onto an image intensifier and means as an ocular for perceiving the intensified image of the scene, a system of input filters obtains color separation in multiplex for feeding to a sole image intensifier. The multiplexed color separated intensified images are joined into a color image. In a system with time multiplexing, a filter disc on the input side rotates in common with another filter disc on the output side. In another system with space multiplexing, the color separated images are obtained by beam splitting side by side on the input surface of the image intensifier and are then combined either with analogous means (filters and reverse beam splitter) or with TV methods.

4 Claims, 3 Drawing Sheets

1

IMAGE REGISTERING IN COLOR AT LOW LIGHT INTENSITY

FIELD OF THE INVENTION

The present invention relates to color imaging in weak light using image intensifiers.

BACKGROUND OF THE INVENTION

Optical image intensifiers, e.g. of the microchannel plate type, are well-known and widely used for night vision use. A scene is projected by an optical system onto the input surface of an intensifier tube, and the resulting intensified image on the output surface may be perceived e.g. by an optical microscope system or a TV system. In order to obtain good viewing, the image tube is normally provided with a phosphor layer emitting in a greenish color, corresponding to the maximum light sensitivity of the human eye.

Due to the sensor construction in the human eye, with rods for night vision, void of color sensitivity, and cones for daylight and color vision, it is not generally realized that in fact, a natural scenery has just as much color by night as by day, as long as the available light is multicoloured, which is the case both for moonlight and for starlight, possibly with a different spectral distribution.

It is the general object for the invention to utilize this insight by obtaining a night vision/imaging system which admits of color perception of feebly lit scenes. Besides the obvious military use, such a system would be favorable e.g. for nature viewing and photographing at night or in caverns, hunting, for watchmen and on ships at night.

It is a further object to obtain color vision at night with the use of means which are not too expensive. Although optical image intensifiers nave been improved in recent years, with prices decreasing, they are still expensive and need electrical H.T. equipment, and the invention therefore envisages obtaining color vision using only one image intensifier, which is used in a multiplex system.

SUMMARY OF THE INVENTION

The present invention provides a device for obtaining a viewable image in color wherein a sole image intensifier is provided at its input side with an optical imaging system comprising a plurality of color filters, imaging a scene in color multiplex, and at its output side with means for combining the multiplexed output plurality of one-color images into a viewable color image. According to a first aspect of the invention, the multiplex is a time multiplex, such that the plurality of filters are used successively. In a particularly attractive embodiment thereof, a set of filters are switchingly introduced, e.g. on a revolving disc in the input imaging system, and a corresponding set of discs are arranged for filtering the image created on the output surface of the imaging tube. For occular viewing, the eye will be able to create a color image from the successive different color separated images, much as a multicolored sectored disc when seen rotated will look single-colored, white if the mixture is right. In this embodiment, the phosphor must have a sufficiently broad color spectrum, preferentially looking white. In the absence of output filtering, the output image is monochrome, since the intensifier tube is fundamentally monochrome.

With the time multiplex aspect, it is also possible to perceive the different images separately via a TV camera tube and make the combination subsequently. In that case, the phosphor does not have to have a broadband spectrum.

According to a second aspect of the invention, the multiplex is a space multiplex, where on the input surface of the intensifier tube is provided a plurality of color-filtered images simultaneously, so to say side-by-side. Such a system must have a plurality of ray-paths, each with its own color filter. In preferred embodiments, those ray-paths are obtained by means of a beam-splitter system, as a system with separate openings would create parallax. Systems with dichroic mirrors can be envisaged, but presently, a system is preferred where a mirror is cut up into a plurality of pieces, which are angled such as to create separate images on to the input surface of the image intensifier. The output images may be scanned by a TV camera tube, giving a host of possibilities when combining, including image analysis, false color imaging etc. The combining can also be made by means of a reversing beam-splitter, creaking a combined image for ocular viewing.

In a preferred embodiment for space multiplex, the beam-splitter is itself imaging, being a mirror optical system of the Cassegrain or similar type where one mirror, for instance the main mirror, is cut up into sectors, which are angled to give a plurality of images. In order to enlarge the field, corrected systems may be used, so-called aplanatic mirror systems, one of the best known solutions is the addition of a Schmidt corrector plate. An advantage with mirror systems is the intrinsic achromacity.

BRIEF DESCRIPTION OF THE DRAWINGS

The invention shall now be further explained by reference to the Figures.

DETAILED DESCRIPTION OF THE INVENTION

Figure 1:
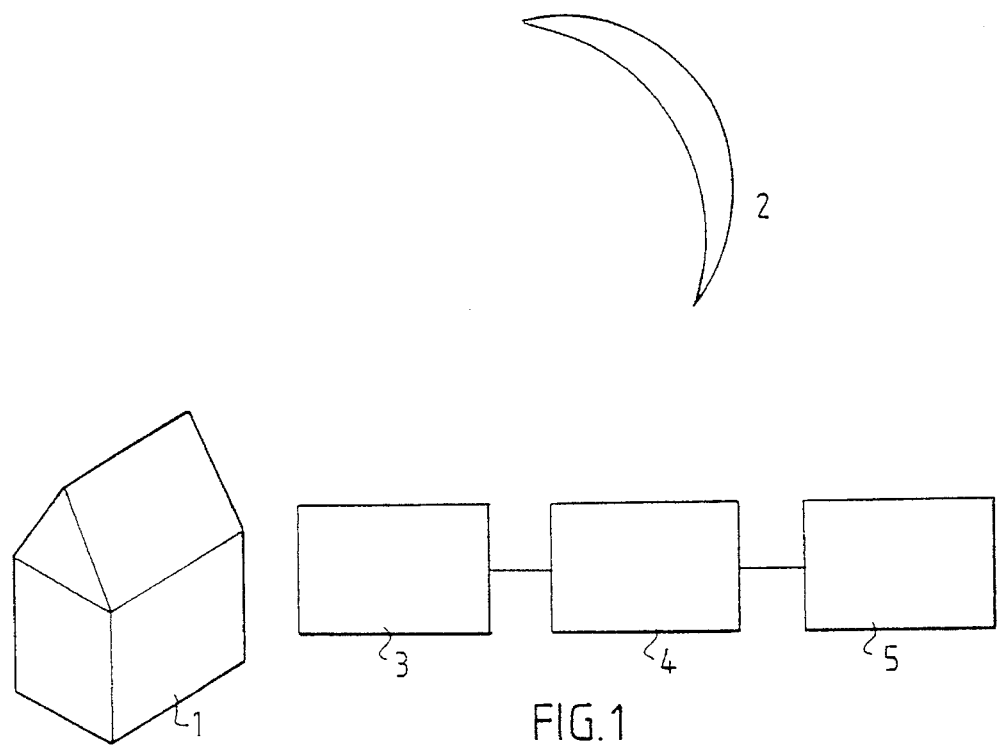
FIG. 1 shows a block diagram for a device according to the invention, being in use.

In FIG. 1, a schematically shown scene 1 is lit from a weak light source 2 (a new moon). An instrument comprises a first section 3, where a real image is created on the entrance surface of an image intensifier, there being a separation of colors in multiplex. Box 4 symbolizes the viewing of the exit surface of the image intensifier, including a demultiplexing for reconstituting a color image. The reconstituted image in colors is a viewer 5, which may be a human eye or some TV device.

Figure 2:
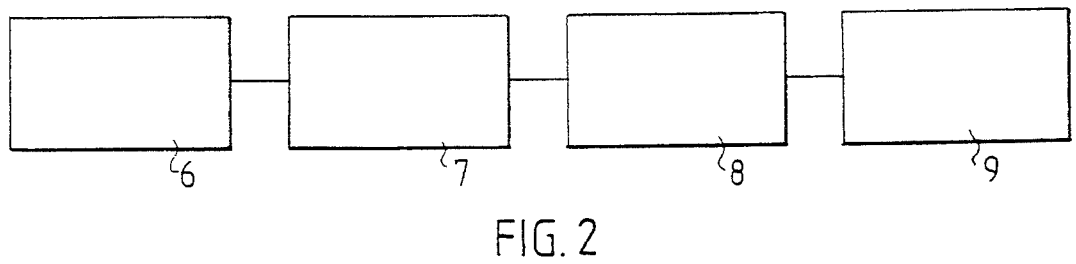
FIG. 2 shows a block diagram of a device.

In FIG. 2, the functions are further split up. Box 6 symbolizes an imaging optical system including a multiplexing device for separating at least two wavelengths, and preferentially three. Box 7 is an image intensifier. Box 8 is an optical system including a demultiplexer, whereas 9 is an observer, human or otherwise.

Figure 3:
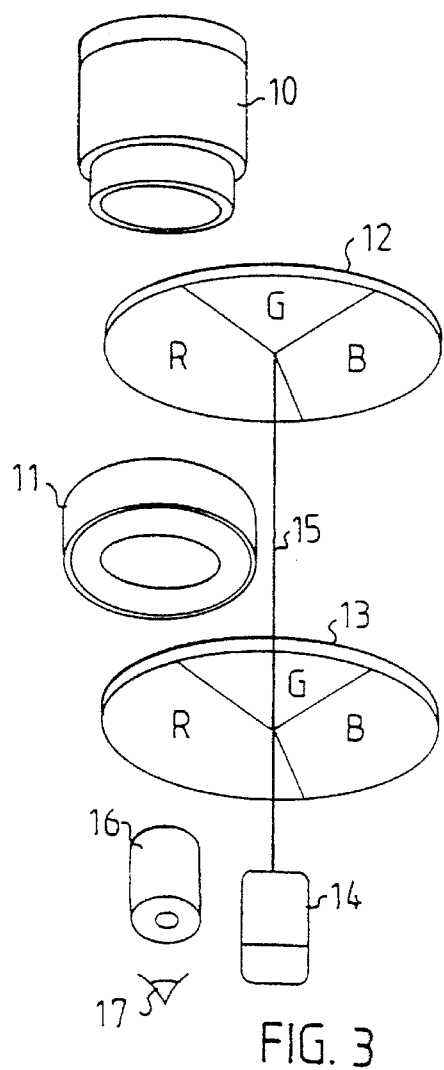
FIG. 3 shows a first embodiment of the invention.

In FIG. 3 is shown a general view over a first embodiment of the invention, with a time multiplex solution. An entrance objective 10 is set to focus a scene (not shown) onto the entrance surface of image intensifier 11, the output image being viewable through ocular 16. So far described, this setup is similar to a conventional monochrome system.

According to the invention, the system also includes multiplexing means and demultiplexing means. A disc 12 comprising three filter sectors, red (R), blue (B), green (G) is mounted on the objective side of the image intensifier 11, and on the other side is a similar disc 13 with corresponding filter sectors. The two discs are rotated by a motor 14 and a common shaft 15. As shown, the sectors have equal size, but the size relationship should be adapted to the relative spectral efficiencies of the image intensifier 11, including both the photoelectric efficiency on the entrance and the phosphor spectrum on the output, the latter giving preferentially off white light. With an appropriate motor speed, in relation to the speed of the image intensifier, eye 17 will see an intensified color image of a scene in front of objective 10.

It is advantageous, although not shown in the Figure, to mount the discs 12 and 13 in or near real imaging planes, e.g. those of the intensifier, as this improves the color separation. Each portion of the image intensifier will then more strictly be "tuned" to a definite color practically free of mixture. Particularly with more complicated optical systems than that shown in FIG. 3, there may be a selection of intermediate images selectable.

Figure 4:
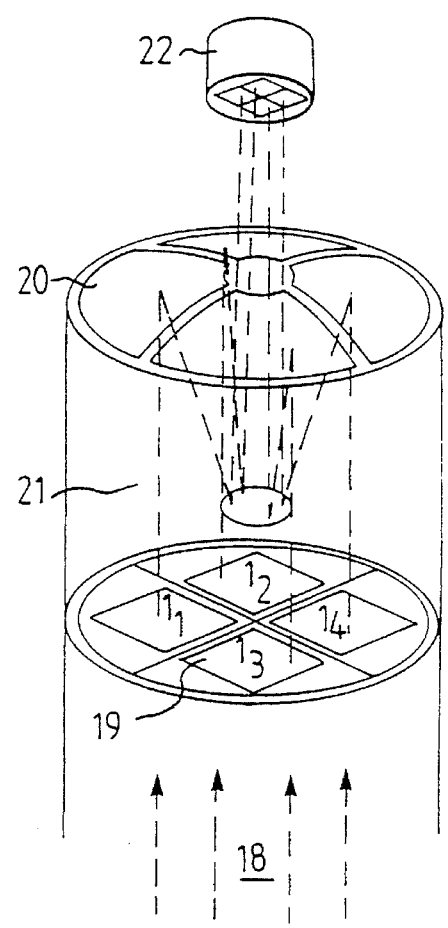
FIG. 4 shows part of a second embodiment of the invention.

FIG. 4 demonstrates an input system for space multiplexing, with mirror optics. Input light 18 is brought through a filter stage 19 with four different filters $\lambda_1$–$\lambda_4$. The rays passing through are reflected back on a parabolic mirror 20, to hit second mirror 21 and create images on image intensifier 22. This is a Cassegrain mount. In order to obtain the space multiplexing, mirror 20 is cut up into four sectors, which are slightly angled to create four different images of different colors on to the input surface of the intensifier, and four different images will thus be created on the output surface (not shown). They may be used to make a composite image, e.g. by conventional television methods. In order to obtain an advantageous image, advanced image processing methods are available, including false color methods.

Figure 5:
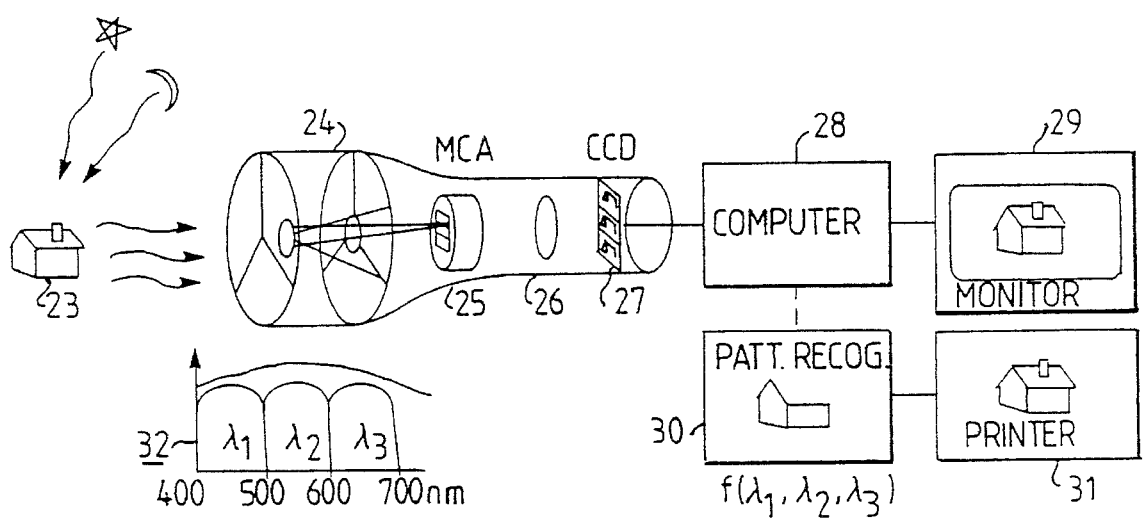
FIG. 5 shows a more complete view of a second embodiment.

This concept is further explained in FIG. 5, wherein a scene 23 is viewed through a modified Cassegrain telescope, creating four real images of separated colors on to MCA 25, the intensified images being by an optical system 26 on to a charge coupled device or CCD 27. The CCD signals are evaluated by a computer 28 for creating a TV signal for monitor 29. A pattern recognition system 30 may evaluate the images and present them in false or true colors via a printer, e.g. of the ink jet writer. As demonstrated at 32, it is appropriate to use color filters which cover the visible range without overlap, but in some cases, also invisible radiation may be of value, the presentation of necessity then being in false colors.

The astronomical type telescope shown is simple but not optimal as to wide-angle imaging, as is well-known to telescope experts, and there are known many modified telescope constructions for making coma reduced, aplanatic images. A typical example is the introduction of a Schmidt correction plate. Since such constructions are well-known, it is clear that the man of the art may suggest particular solutions; which do not therefore fall outside of the invention.

What is claimed is:

1. A device for obtaining a viewable image from a weakly illuminating scene comprising a first optical system and image intensifier means for imaging the scene on to an image intensifier input surface, and a second optical system for perceiving an intensified image on an image intensifier output surface, said first optical system comprising a plurality of mutually different input color filters, and a beamsplitter for obtaining a plurality of images spacedly and simultaneously on to said input surface, filtered through one of said input filters, respectively, said image intensifier means comprising a sole image intensifier, multiplexer means which are spaced-multiplexing for obtaining in multiplex through said filters a plurality of color-separated intensified images on the image intensifier output surface, and means for obtaining a composite color image from said plurality of color-separated intensified images.

2. A device as claimed in claim 1 wherein said beamsplitter comprises a concave mirror which is cut up into portions which form small mutual angles, each said portion cooperating with a respective one of said input filters for creating said plurality of images on said input surface.

3. A device as claimed in claim, 2 wherein the output surface of the image intensifier is imaged by an optical system on to a charge coupled device which has an output connected to a computer joining said plurality of images into a color image.

4. A device as claimed in claim, 2 wherein the output surface of the image intensifier is provided with a reverse beam splitter for adding the respective images through filters for obtaining a color image.

\* \* \* \* \*